May 24, 1932.  N. B. THOMAS  1,860,301
ELECTRICALLY HEATED IRON
Filed March 26, 1928
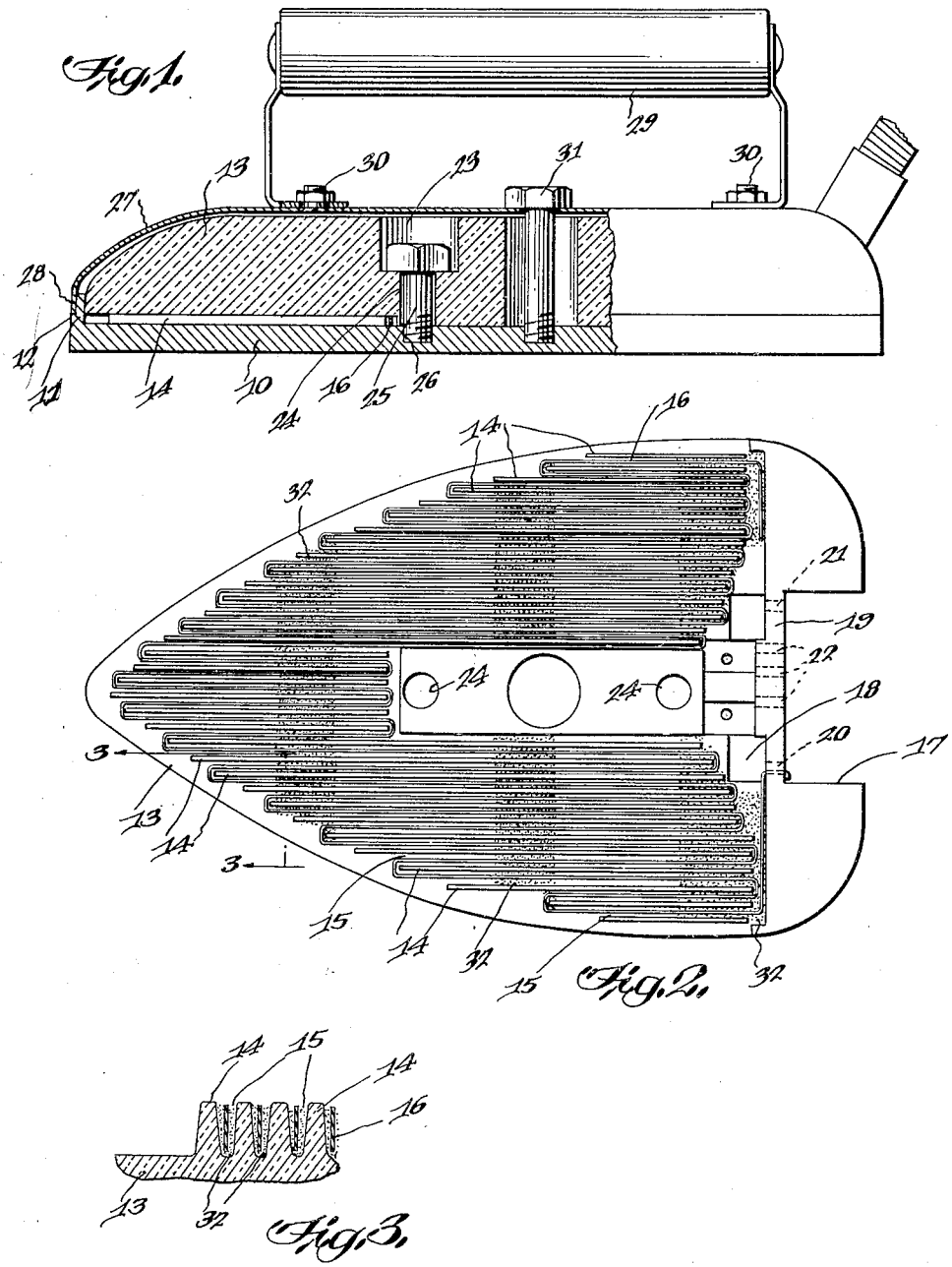
Noble B. Thomas
INVENTOR
BY Victor J. Evans
ATTORNEY Patented May 24, 1932

1,860,301

UNITED STATES PATENT OFFICE

NOBLE BENTON THOMAS, OF LOGANSPORT, INDIANA

ELECTRICALLY HEATED IRON

Application filed March 26, 1928. Serial No. 264,881.

This invention relates to certain novel improvements in electrically heated irons and has for its principal object the provision of an improved construction of this character which will be highly efficient in use and economical in manufacture.

Another object of the invention is to provide a construction for irons of the above named character in which the heating element will be located in close proximity to the ironing surface.

Still another object of the invention is to mount the heating unit in a heat retaining member in order that the efficiency of the iron may be increased.

A further object of the invention is to arrange the heating element in such a manner that a so-called ribbon conductor may be employed instead of the usual round wire.

A still further object of the invention is to arrange the heating element in such a manner that it may be expeditiously removed in order to facilitate repairing of the iron.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a side view partly in elevation and partly in section of an electric iron constructed in accordance with my invention;

Fig. 2 is a bottom plan view of the member carrying the heating element; and

Fig. 3 is a sectional detail view taken substantially on the line 3—3 on Fig. 2.

In the drawings wherein a preferred embodiment of my invention is illustrated, 10 indicates a base of the iron which is preferably made smooth on its outer side and which embodies a peripheral configuration substantially similar to that indicated in Fig. 2. On the inner side of the base 10, an upstanding lip 11 is provided which has a recess 12 formed on the outer side thereof.

My improved construction contemplates providing a body 13 preferably composed of a vitreous material such as porcelain which will embody heat retaining properties and which will also be non-conductive to electricity. On the lower side of the body 13 a plurality of spaced apart co-extensive ribs 14 are provided which are preferably disposed in the manner best illustrated in Fig. 2. As is clearly illustrated in Fig. 3 the ribs are spaced apart a distance great enough to provide channels 15 through which the ribbonlike conductor 16 is directed. This ribbonlike conductor 16 is preferably made of a wire embodying a high resistance in order that it will become heated when current is passed therethrough.

A recess 17 is provided at the rear end of the body 10 and a depressed portion 18 is provided adjacent the rear end such that a rib 19 is defined. Extending through the rib 19 are openings 20 and 21 through which the ends of the conductor 16 are directed. Other openings 22 are provided in the rib 19 through which suitable screws (not shown) extend so as to secure the usual connecting element (not shown) in the recess 19.

In assembling the device, the body 13 is disposed on the member 10 such that the ribs 14 rest on said body 10 as is clearly illustrated in Fig. 1. Recesses such as 23 extend down from the upper side of the body 13 and openings such as 24 extend from the lower end of the recess 23 to the opposite side of the body portion 13. Bolts such as 25 have their heads disposed in the recesses 23 and the shanks thereof extend through the openings 24 and screw-threadedly engage in openings 26 provided in the base 10 and thus the body 13 is secured to the base 10.

A covering body 27 is provided which embodies a configuration similar to the base 10 and the body 13 and this cover has a lip 28 which is adapted to rest on the shoulder 12. A suitable handle 29 is secured to the cover 27 in any approved manner as by the bolt and nut constructions 30. Aligned openings are provided in the cover 27, the body 13, and the base 10, this last named opening being screw threaded and a bolt 31 extends through these openings and secures the cover 27 in position over the body 13.

In order to attain access to the heating element 13 the bolt 31 is removed which permits the removal of the cover 27. The bolts 25 are next detached and thus the body 13 carrying the heating element may be removed. It is apparent that this affords a very simple construction which may be very easily replaced or repaired.

Inasmuch as the heating element 16 is juxtaposed the base 10, it is apparent that said base will be readily heated and since the body 13 is formed of a heat retaining material, it is apparent that the efficiency of the iron will be increased. I have found it advisable to secure the ribbon conductor between the ribs 14 and in order to accomplish this I employ a suitable plastic cement at points such as those indicated by 32.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claim.

Having thus described my invention what I claim as new and desire to protect by Letters Patent is:

An electric iron comprising, in combination, a substantially flat metallic base having a lip extending upwardly from one face thereof at the edges, a body composed of a heat retaining non-electrically conductive material, said body having ribs formed on one face thereof extending across said body in parallel spaced apart relation to define channels therebetween, a substantially ribbon like electric resistance element directed through said channels around said ribs, and an adhesive material disposed in said channels at spaced apart intervals for retaining said resistance element therein, said body being retained on said base by said lip with the ribs thereon in abutment with said base, and means for detachably securing said body to said base.

In testimony whereof I affix my signature.

NOBLE BENTON THOMAS.